(12) United States Patent
Putman et al.

(10) Patent No.: US 11,662,563 B2
(45) Date of Patent: *May 30, 2023

(54) FLUORESCENCE MICROSCOPY INSPECTION SYSTEMS, APPARATUS AND METHODS WITH DARKFIELD CHANNEL

(71) Applicant: Nanotronics Imaging, Inc., Cuyahoga Falls, OH (US)

(72) Inventors: Matthew C. Putman, Brooklyn, NY (US); John B. Putman, Celebration, FL (US); Vadim Pinskiy, Wayne, NJ (US); Denis Sharoukhov, Brooklyn, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,818

(22) Filed: Apr. 4, 2022

(65) Prior Publication Data

US 2022/0221703 A1    Jul. 14, 2022

Related U.S. Application Data

(63) Continuation of application No. 16/751,303, filed on Jan. 24, 2020, now Pat. No. 11,294,162, which is a
(Continued)

(51) Int. Cl.
*G02B 21/16* (2006.01)
*G02B 21/36* (2006.01)
(Continued)

(52) U.S. Cl.
CPC .......... *G02B 21/16* (2013.01); *G02B 21/125* (2013.01); *G02B 21/18* (2013.01); *G02B 21/367* (2013.01);
(Continued)

(58) Field of Classification Search
CPC ...... G02B 21/16; G02B 21/125; G02B 21/18; G02B 21/367; G06K 9/00134; G06K 9/00147; H04N 5/247
See application file for complete search history.

(56) References Cited

U.S. PATENT DOCUMENTS 6,259,807 B1   7/2001  Ravkin
7,504,642 B2   3/2009  Hummel et al.
(Continued)

FOREIGN PATENT DOCUMENTS

JP    H3-266809    11/1991
JP    H8-145888    6/1996
(Continued)

OTHER PUBLICATIONS

Thierry-Jebali, et al., "Application of UV photoluminescence imaging spectroscopy for stacking faults identification on thick, lightly n-type doped, 4°-off 4H-SiC epilayers," AIP Advances 5.3, 2015, 037121.
(Continued)

*Primary Examiner* — Richard T Torrente
(74) *Attorney, Agent, or Firm* — DLA Piper LLP (US)

(57) ABSTRACT

A fluorescence microscopy inspection system includes light sources able to emit light that causes a specimen to fluoresce and light that does not cause a specimen to fluoresce. The emitted light is directed through one or more filters and objective channels towards a specimen. A ring of lights projects light at the specimen at an oblique angle through a darkfield channel. One of the filters may modify the light to match a predetermined bandgap energy associated with the specimen and another filter may filter wavelengths of light reflected from the specimen and to a camera. The camera
(Continued)

may produce an image from the received light and specimen classification and feature analysis may be performed on the image.

20 Claims, 13 Drawing Sheets

Related U.S. Application Data continuation of application No. 16/399,058, filed on Apr. 30, 2019, now Pat. No. 10,578,850.

(60) Provisional application No. 62/802,246, filed on Feb. 7, 2019.

(51) Int. Cl.
  *G02B 21/12* (2006.01)
  *G02B 21/18* (2006.01)
  *G06V 20/69* (2022.01)
  *H04N 23/90* (2023.01)

(52) U.S. Cl.
  CPC .......... *G06V 20/693* (2022.01); *G06V 20/698* (2022.01); *H04N 23/90* (2023.01)

(56) References Cited

U.S. PATENT DOCUMENTS

| | | | |
|---|---|---|---|
| 9,163,987 B2 | 10/2015 | Sappey et al. | |
| 9,575,304 B2 | 2/2017 | Dixon | |
| 9,891,419 B2 | 2/2018 | Arashi | |
| 10,578,850 B1 | 3/2020 | Putman et al. | |
| 2002/0071175 A1* | 6/2002 | Murakami | G02B 21/241 359/383 |
| 2004/0146295 A1* | 7/2004 | Furman | G01N 21/95607 398/9 |
| 2004/0207836 A1 | 10/2004 | Chhibber et al. | |
| 2008/0158566 A1* | 7/2008 | Suzuki | H04N 5/2254 356/450 |
| 2009/0066934 A1* | 3/2009 | Gao | G01N 1/2273 356/417 |
| 2011/0049389 A1 | 3/2011 | Kishima et al. | |
| 2012/0049085 A1 | 3/2012 | Sappey et al. | |
| 2013/0229707 A1 | 9/2013 | Sakaguchi | |
| 2013/0229709 A1 | 9/2013 | Newswander et al. | |
| 2013/0260381 A1 | 10/2013 | Ramakrishnan | |
| 2013/0260382 A1 | 10/2013 | Ghosh et al. | |
| 2016/0320306 A1* | 11/2016 | Huffman | G01N 15/1434 |
| 2017/0121106 A1 | 5/2017 | Loney et al. | |
| 2018/0188188 A1 | 7/2018 | Zhao et al. | |
| 2019/0212277 A1 | 7/2019 | Zhao et al. | |
| 2020/0141879 A1 | 5/2020 | Regensburger et al. | |
| 2022/0214287 A1 | 7/2022 | Regensburger et al. | |

FOREIGN PATENT DOCUMENTS

| | | |
|---|---|---|
| JP | 2008-139795 | 6/2006 |
| WO | 2018/071137 | 4/2018 |
| WO | 2018229709 | 12/2018 |

OTHER PUBLICATIONS

Leica Microsystems, "Leica DM IL LED—Inverted Routine Microscopy in a New Light," 2019, 12 pages.

International Search Report of PCT/US20/16497, dated Apr. 27, 2020.

Stokowski, et al., "Wafer Inspection Technology Challenges for ULSI Manufacturing," AIP Conference Proceedings 449, 405, 1998, 12 pages.

Carro, et al., "iMSRC: converting a standard automated microscope into an intelligent screening platform," Scientific Yeports 5.1, 2015, 6 pages.

* cited by examiner

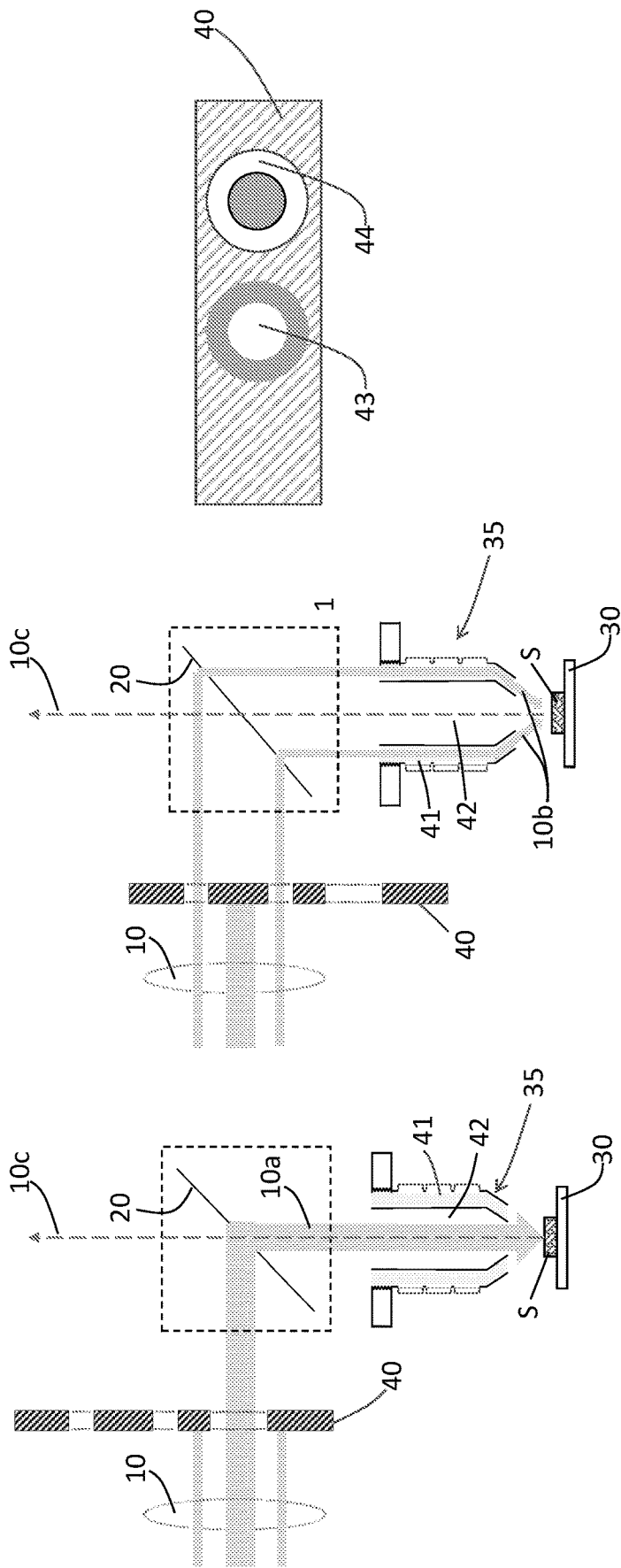

FLUORESCENCE MICROSCOPY INSPECTION SYSTEMS, APPARATUS AND METHODS WITH DARKFIELD CHANNEL

CROSS-REFERENCE TO RELATED APPLICATIONS

This is a continuation of U.S. application Ser. No. 16/751,303, filed Jan. 24, 2020, which is a continuation of U.S. application Ser. No. 16/399,058, filed Apr. 30, 2019, now U.S. Pat. No. 10,578,850, issued Mar. 3, 2020, which claim priority to U.S. Application Ser. No. 62/802,246, filed Feb. 7, 2019, which are incorporated by reference in their entireties.

TECHNICAL FIELD

The present disclosure generally relates to fluorescence microscopy inspection systems, apparatus and methods using incoherent illumination techniques. More particularly, embodiments of the present invention relate to fluorescence microscopy inspection systems that can provide incoherent light of variable wavelengths targeted to excite specific layers of a specimen or materials contained in a specimen and automatically detect features of a specimen from the resulting fluorescence caused by the absorption of light or other electromagnetic radiation.

BACKGROUND

Projecting non-visible light at a specimen and capturing the resulting fluorescence/photoluminescence emitted by a specimen can provide important information about the quantity, type, location and morphology of features on a specimen. Further, certain features of a specimen, such as the purity or structural imperfections of the specimen, among others, may only be observed using non-visible illumination. Specimens as understood by a person of ordinary skill in the art refer to an article of examination (e.g., a wafer or a biological slide) and features refer to observable characteristics of a specimen, including abnormalities and/or defects. Features can include but are not limited to: circuits, circuit board components, biological cells, tissue, defects (e.g., impurities, structural imperfections, irregularities, stacking faults, contaminants, crystallographic defects, scratches, dust, fingerprints).

Note, the term fluorescence (FL) as used herein includes photoluminescense, which is commonly associated with light emissions from semiconductor materials. Non-visible light refers to the region of the electroagnetic spectrum with a wavelength between 10 and 400 nanometers (nm) (i.e., the region between visible light and X-rays). In some embodiments, for example, light wavelengths in the range of 200 nm to 400 nm, 300 nm to 400 nm, and/or any other suitable wavelengths can be selected. Moreover, the light wavelength required to excite a specimen and cause fluoresencese by a specimen from the absorption of light or other electromagnetic radiation is not restricted to the wavelength range between 10 nm to 400 nm, but, in some embodiments, can be selected in a range above 400 nm to provide the desired excitation to a specimen, as explained herein. Coherent light refers to particles of light energy that have the same frequency and its waves are in phase with one another. In contrast, the particles of light energy of incoherent light do not have the same frequency and its waves are not in phase with one another.

While coherent light sources (e.g., lasers) are commonly used for specimen fluorescence, such light sources are not ideal for detecting large features or for use with certain types of specimens (e.g., patterned wafers). Incoherent light sources, on the other hand, are better suited for detecting a greater range of features (including large features and features on patterned wafers). Moreover, coherent light sources illuminate only a small portion of a field of view, whereas incoherent light illuminates the entire field of view, making it more suitable for creating specimen feature maps. Specimen feature maps classify features on a specimen and specify their location. Note, the term field of view as understood by a person of ordinary skill in the art refers to an area of examination that is captured at once by an image sensor. Further, a person of ordinary skill in the art will readily understand that the terms field of view and image are used interchangeably herein.

Accordingly, new fluorescence microscopy inspection mechanisms using incoherent illumination techniques are desirable to excite specific layers of a specimen or materials contained in a specimen to cause them to fluoresce and to automatically detect features of a specimen from the resulting fluorescence. Moreover, it is also desirable for the same mechanisms to inspect features of a specimen using illumination techniques that do not cause fluorescence.

SUMMARY

In one example, a system includes a frame, one or more incoherent light sources connected to the frame and configured to emit at least a first wavelength of light that will cause a specimen to fluoresce and a second wavelength of light that will not cause a specimen to fluoresce, wherein the emitted light is configured to be directed to the specimen, an excitation filter connected to the frame and configured to filter light from the one or more light sources, wherein the filtered light is configured to match a predetermined bandgap energy associated with the specimen, an objective connected to the frame, the objective comprising a brightfield channel and a darkfield channel, a slider connected to the frame and positioned along a lightpath between the objective and the one or more incoherent light sources, wherein the slider includes at least one configuration configured to transmit light along the lightpath to at least a darkfield channel configured to direct light to the specimen at an oblique angle, and an emission filter connected to the frame and configured for filtering selected wavelengths of light reflected from the specimen to a receiving camera.

In some examples, the at least one configuration of the slider is configured to transmit light to both the brightfield channel and the darkfield channel.

In some examples, the system further includes a nosepiece connected to the frame, wherein the objective is connected to the nosepiece via an attachment, and a darkfield insert fastened to the attachment and positioned above the darkfield channel of the objective, the darkfield insert including a ring of lights configured to project light at the specimen at an oblique angle.

In some examples, the slider is a filter slider connected to the frame and positioned below the darkfield insert, the filter slider configured to provide multiple types of excitation filters, and one or more additional emission filters for one or more of the brightfield channel or the darkfield channel.

In some examples, the system further includes at least a second camera and the emitted light includes visible light and non-visible light directed to respective cameras.

In some examples, the system includes one or more additional camera connected to the frame, each additional camera configured to receive respective unique wavelengths of light.

In some examples, the system further includes one or more processors, and a memory storing instructions that, when executed by the one or more processors, cause the one or more processors to receive image data from the receiving camera, the image data based on the directed light from the specimen, classify the specimen with a trained classifier based on the received image data, retrieve stored system configurations associated with the classification of the specimen, and apply the system configurations to one or more of the light sources, excitation filter, emission filter, or receiving camera.

In some examples, the memory stores further instructions to receive additional image data from the receiving camera, the additional image data received after the system configurations have been applied, identify specimen defects with an image data model based on the received additional image data, and generate a feature map based on the specimen defects.

In some examples, the one or more incoherent light sources further includes a first light source connected to the frame and configured to emit reflected light from the one or more incoherent light sources to the specimen, and an additional light source attached to the frame below the specimen and configured to increase the intensity of light on the specimen by emitting light directed at the specimen simultaneously to the light emitted by the one or first incoherent light source.

In some examples, the system further includes a beam splitter connected to the frame and configured to direct emitted light towards the specimen.

In one example, a method includes emitting from one or more incoherent light sources a first wavelength of light that causes a specimen to fluoresce and a second wavelength of light that does not cause the specimen to fluoresce, wherein the emitted light is directed to the specimen, filtering the emitted light through an excitation filter, the filtered light matching a predetermined bandgap energy, transmitting the emitted light through a slider to the specimen via a darkfield channel of an objective at an oblique angle, and directing light reflected from the specimen to a receiving camera, the reflected light in response to the directed filtered light wherein the directed light reflected from the specimen comprises selected wavelengths.

In some examples, the method further includes transmitting the filtered light to the specimen through the slider to a brightfield channel of the objective.

In some examples, the method includes a darkfield insert, positioned above the darkfield channel of the objective, including a ring of lights, emitting light to the specimen at an oblique angle via the darkfield channel of the objective.

In some examples, the emitted light includes visible light and non-visible light, and the method further includes receiving, by a second camera, at least a portion of the directed light reflected from the specimen.

In some examples, the method includes receiving, by one or more additional cameras, unique wavelengths of the light reflected from the specimen.

In some examples, the method includes receiving image data from the receiving camera, the image data based on the directed light reflected from the specimen, classifying the specimen with a trained classifier based on the received image data, retrieving stored system configurations associated with the classification of the specimen, and applying the system configurations to one or more of the light sources, excitation filter, emission filter, or receiving camera.

In some examples, the method includes receiving additional image data from the receiving camera, the additional image data received after the system configurations have been applied, identifying specimen defects with an image data model based on the received additional image data, and generating a feature map based on the specimen defects.

In some examples, the method further includes emitting a first light from a first light source of the one or more incoherent light sources toward the specimen, and increasing the intensity of light on the specimen, by emitting a second light directed at the specimen from an additional light source of the one or more incoherent light sources, from below the specimen, wherein the additional light is emitted simultaneously to the light emitted by the first light source of the one or more incoherent light sources.

In some examples, the method further includes directing the emitted light towards the specimen with a beam splitter.

In one example, an apparatus includes one or more incoherent light sources configured to emit at least a first wavelength of light that will cause a specimen to fluoresce and a second wavelength of light that will not cause the specimen to fluoresce, wherein the emitted light is configured to be directed to the specimen, an excitation filter configured to filter light from the one or more light sources, wherein the filtered light is configured to match a predetermined bandgap energy associated with the specimen, an objective including a brightfield channel and a darkfield channel, a nosepiece connected to the objective via an attachment, a darkfield insert fastened to the attachment and positioned above the darkfield channel of the objective, the darkfield insert including a ring of lights configured to project light at the specimen at an oblique angle, an emission filter configured for filtering selected wavelengths of reflected light from the specimen to a receiving camera, one or more processors, and a memory storing instructions that, when executed by the one or more processors, cause the one or more processors to receive image data from the receiving camera, the image data based on the directed light reflected from the specimen, classify the specimen with a trained classifier based on the received image data, retrieve stored system configurations associated with the classification of the specimen, apply the system configurations to one or more of the light sources, excitation filter, emission filter, or receiving camera, receive additional image data from the receiving camera, the additional image data received after the system configurations have been applied, identify specimen defects with an image data model based on the received additional image data, and generate a feature map based on the specimen defects.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting in their scope, the principles herein are described and explained with additional specificity and detail through the use of the accompanying drawings in which:

FIGS. 3A and 3B show example embodiments of a brightfield/darkfield slider in the light path of a fluorescence microscopy inspection system.

FIGS. 3C, 4A and 4B show example embodiments of a brightfield/darkfield slider.

DETAILED DESCRIPTION

In accordance with some embodiments of the disclosed subject matter, mechanisms (which can include systems, methods, devices, apparatuses, etc.) for fluorescence microscopy inspection using incoherent illumination techniques to excite specific layers of a specimen or materials contained in a specimen to cause them to fluoresce and to automatically detect features of a specimen from the resulting fluorescence are provided. The same mechanism can be also be used to inspect features of a specimen using illumination techniques that do not cause fluorescence. Further, in some embodiments, a pigment can be added to a specimen and incoherent illumination techniques can be used targeted to the pigment to cause it to fluoresce. Inspection (sometimes referred to as examination) refers to scanning, imaging, analyzing, measuring and any other suitable review of a specimen using the disclosed incoherent microscopy inspection mechanism for fluorescence imaging.

Figure 1A:
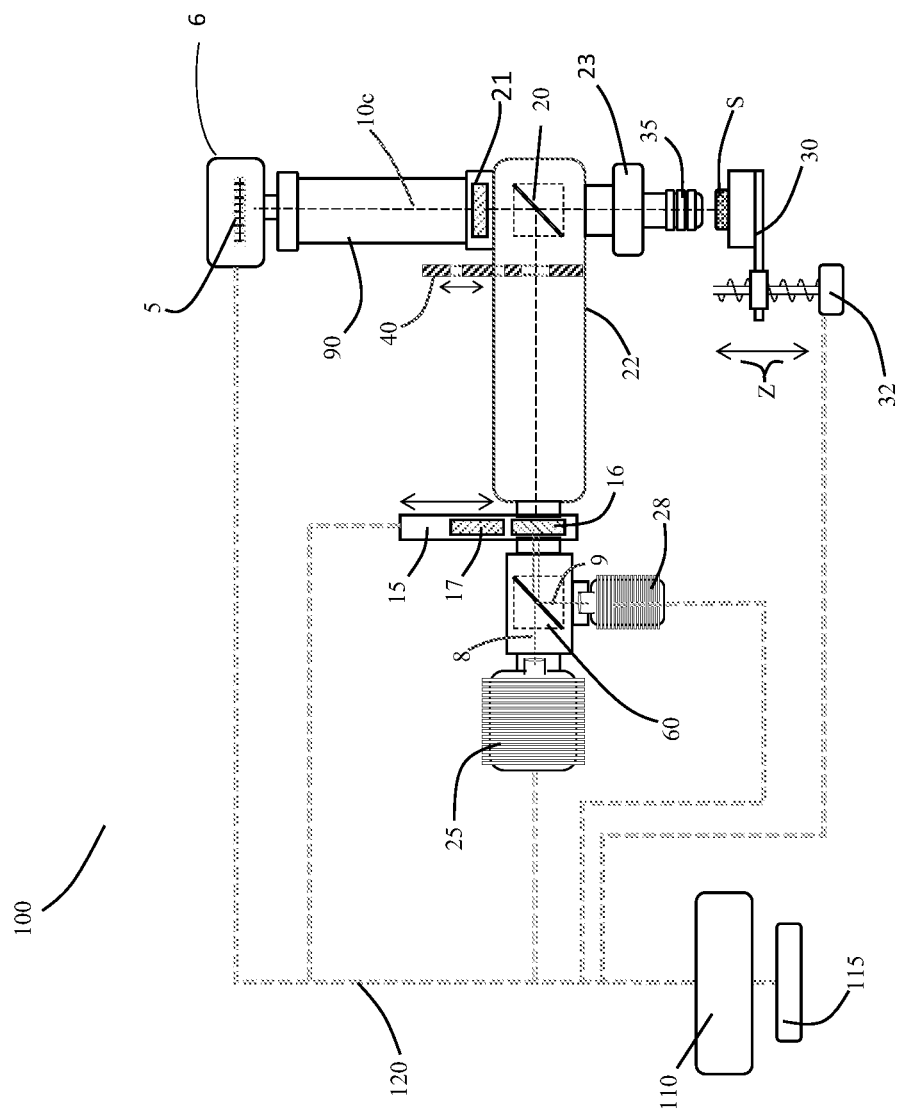
FIGS. 1A and 1B illustrate examples of fluorescence microscopy inspection systems, according to some aspects of the disclosed technology.
Figure 1B:
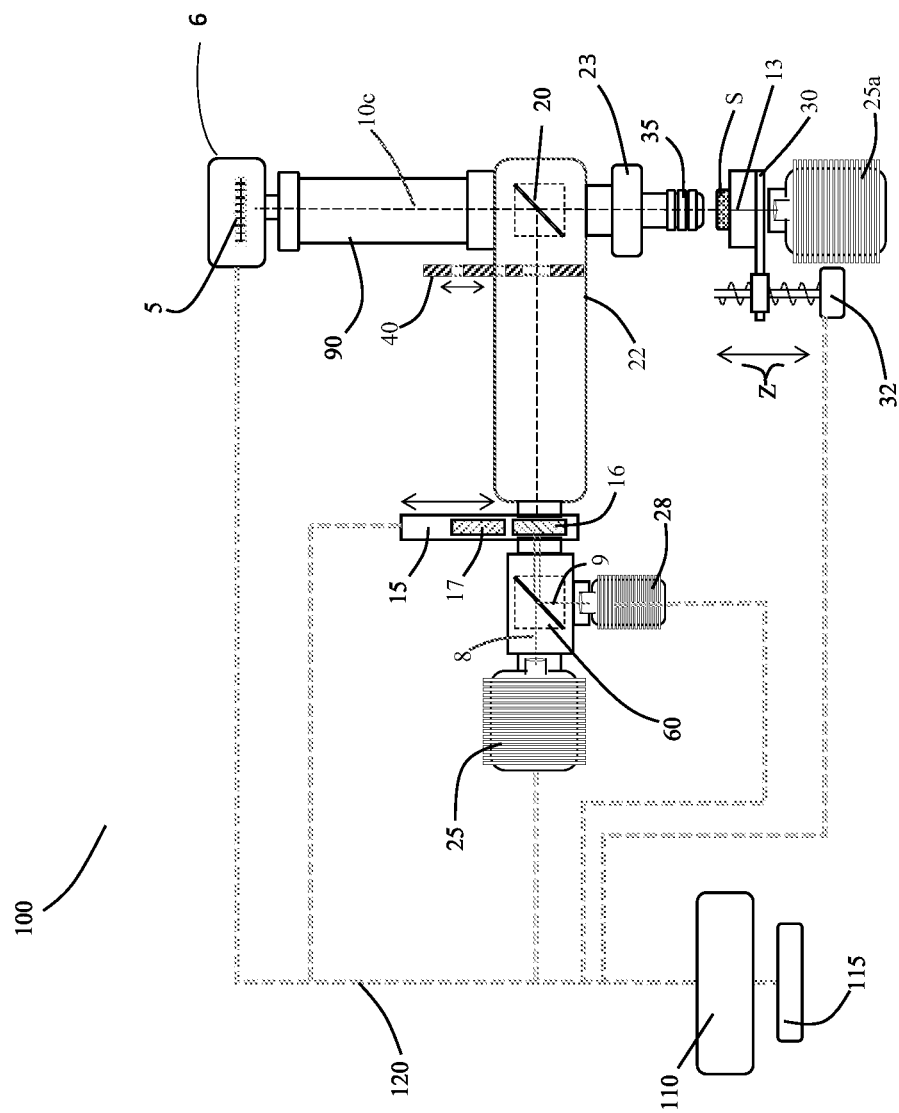

FIGS. 1A and 1B illustrate examples of fluorescence microscopy inspection systems using incoherent illumination for automatically analyzing fluorescence emitted from a specimen (referred to herein as "FMIS 100"), according to some embodiments of the disclosed subject matter. At a high level, the basic components of FMIS 100, according to some embodiments, include one or more illumination sources (e.g. light sources 25, 25a and 28) for providing incoherent light, a focusing mechanism 32 for finding the in-focus plane of a specimen, an illuminator 22, an imaging device 6, one or more objectives 35, a stage 30, one or more filter mechanisms 15, a brightfield/darkfield slider 40 and a control module 110 comprising hardware, software, and/or firmware and a computer analysis system 115. As illustrated, control module 110, and computer analysis system 115 are coupled to inspection system 100 via a communication channel 120. It is understood that communication channel 120 can include one or more signal transmitting means, such as a bus, or wireless RF channel. It is also understood that FMIS 100 can include additional microscope components that are well known in the art. For example, FMIS 100 may include a frame (not depicted) to which the various components of FMIS 100 (e.g., one or more illumination sources, a focusing mechanism, an illuminator, an imaging device, one or more objectives, a stage, one or fore filter mechanisms, a brightfield/darkfield slider, a control module, a nosepiece, a beam splitter) may be connected (e.g., for portability, stability, modular support, etc.). In some embodiments, a computer analysis system may be connected to the frame and in some embodiments it may not. Other microscope components not listed herein, but well known in the art, can also be connected to the frame.

FMIS 100 can be implemented as part of any suitable type of microscope. For example, in some embodiments, FMIS 100 can be implemented as part of an optical microscope that uses reflected light (as shown in FIG. 1A) and/or transmitted light (as shown in FIG. 1B). More particularly, FMIS 100 can be implemented as part of the nSpec® optical microscope available from Nanotronics Imaging, Inc. of Cuyahoga Falls, Ohio.

In some embodiments, an XY translation stage can be used for stage 30. The XY translation stage can be driven by stepper motor, servo motor, linear motor, piezo motor, and/or any other suitable mechanism. The XY translation stage can be configured to move a specimen in the X axis and/or Y axis directions under the control of any suitable controller, in some embodiments.

In some embodiments, a focus mechanism 32 coupled to stage 30 can be used to adjust the stage in a Z direction towards and away from objective 35. Focus mechanism 32 can be used to make coarse focus adjustments of, for example, 0 to 5 mm, 0 to 10 mm, 0 to 30 mm, and/or any other suitable range(s) of distances. Focus mechanism 32 can also be used to move stage 30 up and down to allow specimens of different thicknesses to be placed on the stage. Focus mechanism 32 can also be used in some embodiments to provide fine focus of, for example, 0 to 50 µm, 0 to 100 µm, 0 to 200 µm, and/or any other suitable range(s) of distances. In some embodiments, focus mechanism 32 can also include a location device. The location device can be configured to determine a position of stage 30 at any suitable point in time. In some embodiments, any suitable position (e.g., the position of the stage when a specimen is in focus) can be stored in any suitable manner and later used to bring the stage back to that position, even upon reset and/or power cycling of FMIS 100. In some embodiments, the location device can be a linear encoder, a rotary encoder or any other suitable mechanism to track the absolute position of stage 30 with respect to the objective.

According to some embodiments, FMIS 100 can include, one or more objectives 35. The objectives can have different magnification powers and/or be configured to operate with fluorescence, as well as brightfield/darkfield, differential interference contrast (DIC), polarized light, cross-polarized light, and/or any other suitable form of illumination. The objective and/or illumination technique used to inspect a specimen can be controlled by software, hardware, and/or firmware in some embodiments.

In some embodiments, a second focus mechanism (not shown) can be used to drive objective 35 in a Z direction towards and away from stage 30. The second focus mechanism can be designed for coarse or fine focus adjustment of objective 35. The second focus mechanism can be a stepper motor, servo motor, linear actuator, piezo motor, and/or any other suitable mechanism. For example, in some embodiments, a piezo motor can be used and can drive the objective 0 to 50 micrometers (µm), 0 to 100 µm, or 0 to 200 µm, and/or any other suitable range(s) of distances.

In some embodiments, communication between the control module (e.g., the controller and controller interface) and the components of FMIS 100 can use any suitable communication technologies, that provide the ability to communicate with one or more other devices, and/or to transact data with a computer network. By way of example, implemented communication technologies can include, but are not limited to: analog technologies (e.g., relay logic), digital technologies (e.g., RS232, ethernet, or wireless), network technologies (e.g., local area network (LAN), a wide area network (WAN), the Internet, Bluetooth technologies, Near-field communication technologies, Secure RF technologies, and/or any other suitable communication technologies.

In some embodiments, operator inputs can be communicated to control module 110 using any suitable input device (e.g., keyboard, mouse, joystick, touch, touch-screen, etc.).

In some embodiments, computer analysis system 115 can be coupled to, or included in, FMIS 100 in any suitable manner using any suitable communication technology, such as analog technologies (e.g., relay logic), digital technologies (e.g., RS232, ethernet, or wireless), network technologies (e.g., local area network (LAN), a wide area network (WAN), the Internet) Bluetooth technologies, Near-field communication technologies, Secure RF technologies, and/or any other suitable communication technologies. Computer analysis system 115, and the modules within computer analysis system 115, can be configured to perform a number of functions described further herein using images output by FMIS 100 and/or stored by computer readable media.

Computer analysis system 115 can include any suitable hardware (which can execute software in some embodiments), such as, for example, computers, microprocessors, microcontrollers, application specific integrated circuits (ASICs), field-programmable gate arrays (FPGAs), and digital signal processors (DSPs) (any of which can be referred to as a hardware processor), encoders, circuitry to read encoders, memory devices (including one or more EPROMS, one or more EEPROMs, dynamic random access memory ("DRAM"), static random access memory ("SRAM"), and/or flash memory), and/or any other suitable hardware elements.

Computer-readable media can be any non-transitory media that can be accessed by the computer and includes both volatile and nonvolatile media, removable and non-removable media. By way of example, and not limitation, computer readable media can comprise computer storage media and communication media. Computer storage media can include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

FMIS 100 can include one or more illumination sources, for example light sources 25, 25a and 28. In some embodiments, as shown for example in FIG. 1A, reflected illumination can be used (i.e., light originating from above the specimen). Reflected light passes through vertical illuminator 22 to beam splitter 20. Beam splitter 20 can reflect the light coming from the illumination source(s) at 90° downwards through a nosepiece 23 and through brightfield channel 42 of objective 35 to the specimen. In other embodiments, as shown for example in FIG. 1B, transmitted illumination can be used (i.e., light originating from below the specimen (light source 25a)). The different illumination sources can be configured to provide illumination at wavelengths that are different from each other. The different illumination sources can also be adjusted to control the intensity provided per unit area.

Beam splitter, as used herein, can refer to mirrors, dichroics, filters or beam combiners that transmit light of a known, specified wavelength and combines the transmitted light with light of another known, specified wavelength.

In some embodiments, as shown in FIG. 1B, in order to increase the intensity of light on a specimen, reflected light from illumination sources 25/28 can be projected simultaneously with transmitted light from illumination source 25a. In some aspects, various illumination sources can provide light at similar or equal wavelengths. In other embodiments, FMIS 100 can include a single illumination source that can provide light in ranges of varying wavelengths.

In some embodiments, for example, a first illumination source 25 provides non-visible light 8 (e.g., projecting light with a wavelength in the range of 10 to 400 nanometers (nm)), while the second illumination source 28 provides visible light 9 (e.g., projecting light having a wavelength in the range of 400 to 740 nanometers (nm)). In further embodiments, the illumination sources can provide other suitable wavelengths.

In some embodiments, as shown in FIGS. 1A and 1B, illumination source 25 is positioned so that its light is projected in a substantially horizontal direction towards vertical illuminator 22. Illumination sources 25, 25a and 28 can include a focusing lens suitable for the wavelength of the emitted light of each source.

In some embodiments that use two illumination sources, a beam splitter 60 is placed in the optical pathway of both illumination sources (e.g., illumination sources 25 and 28) before the light travels to vertical illuminator 22. The illumination sources can be activated so that they are both providing illumination at the same time or at different times. Other placements of the illumination sources are contemplated, without departing from the scope of the disclosed technology. Note that a combination of the aforementioned devices, in any suitable configuration, can be used to reflect and transmit the desired illumination sources and wavelengths. In some embodiments, a beam splitter having a specific cut-off wavelength is selected in order to reflect the wavelengths of light emitted by illumination source 28 and to allow the wavelengths of light emitted from illumination source 25 to pass through. Beam splitter 60 can be designed for a 45° angle of incidence, so that rejected light from illumination source 28 is reflected at an angle of 90° and travels parallel to the light path from illumination source 25. Other beam splitter designs are contemplated, without departing from the scope of the disclosed technology.

Note that, in some embodiments, any suitable incoherent illumination source(s) can be used with illumination sources 25, 25a and 28, including, but not limited to, light-emitting diodes (LEDs), halogen lamps and/or fluorescent lights.

In some embodiments, a filter mechanism 15 can be used to allow specified wavelength ranges from light sources 25 and 28 to pass through to a specimen. Filter mechanism 15 (also referred to as an excitation filter), can be, for example a slide having different bandpass filters (e.g., bandpass filters 16 and 17). Each bandpass filter allows certain wavelengths to pass through and blocks all other wavelengths. A motor or a mechanical mechanism can be used to select and position one of the bandpass filters. In other embodiments, a tunable filter that includes software, firmware, and/or hardware can be used to control the desired wavelengths to pass through to the specimen. In some embodiments, the bandpass filter that is selected can be based on the bandgap properties of one or more of the materials in the specimen. By way of example, the bandpass filter may be selected to correspond with a wavelength energy that matches or exceeds the bandgap of one of the materials in a specimen that is being inspected. In other words, the wavelength energy that is transmitted to a specimen, can be selected so that it causes a target material within the specimen to fluoresce. Each material has a known bandgap energy that is different from other materials. Bandgap energy refers to the energy difference between the top of the valence band and the bottom of the conduction band of a particular material. Fluorescence occurs when electrons in a material are excited by wavelengths of light, so that they absorb photons and emit an excitation light (often the emitted light is emitted at a longer wavelength than the light absorbed). In addition to applying the appropriate wavelength to excite a specimen, sufficient intensity must also be applied per unit area, so that fluorescence can occur. The sufficiency of the intensity per unit area will depend on the material composition of the specimen and is generally in the range of 1 Watt/cm$^2$ through 11 Watt/cm$^2$. For example, an illumination source projecting light at a wavelength of 365 nm and intensity of 4 Watts can be applied to a specimen of Silicon Carbide that has a bandgap energy of 3.26 eV to excite a fluorescence response.

In further embodiments, the wavelength energy selected can correspond to the wavelength energy needed to cause a target material within the specimen and/or a pigment added to a target specimen to fluoresce. Note, that the term "excite" refers to the wavelength energy that causes a specimen or a pigment added to the specimen to fluoresce (i.e., emit fluorescence).

In some embodiments, an excitation filter mechanism can be used based on the desired microscopy inspection to be performed and allow, for example, only wavelengths in a selected range to pass through. By way of example, the filter mechanism may be used to select wavelengths in the non-visible range (e.g., ultraviolet light from illumination source 25) or wavelengths in the visible range (e.g., from illumination source 28) to pass through. In other embodiments, a filter mechanism can be used to transmit a specific wavelength of light to a specimen (e.g., the wavelength that corresponds to the bandgap of the material that is being inspected and will excite the material).

Note that excitation filter slider 15 represents an example embodiment, and one or more excitation filter(s) can be placed at any suitable position along the light path, before the light reaches the specimen. In some embodiments, slider 40 can include an excitation filter and/or an excitation filter can be included in nosepiece 23. These various embodiments will be described herein.

In further embodiments, one or more emission filters can be used to allow the appropriate wavelengths to be transmitted from the specimen to the imaging device, so that only the desired wavelengths are imaged. Similar to the excitation filter, the emission filter can be a bandpass filter that allows certain wavelengths through and blocks others. In other embodiments, a tunable filter that includes software, firmware, and/or hardware can be used to control the desired wavelengths that pass through.

Figure 6A:
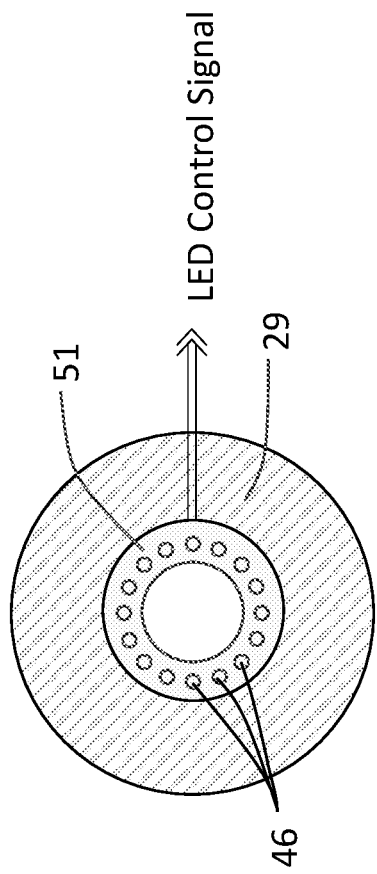
FIG. 6A shows an example embodiment of a darkfield insert.
Figure 6B:
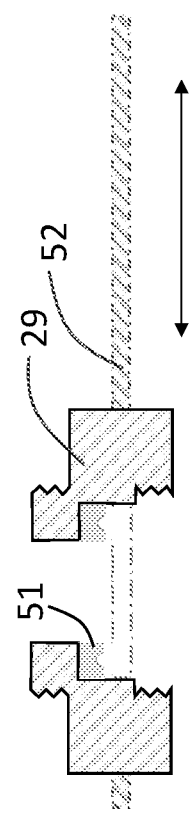
FIG. 6B shows an example embodiment of a cylinder attachment.
Figure 6C:
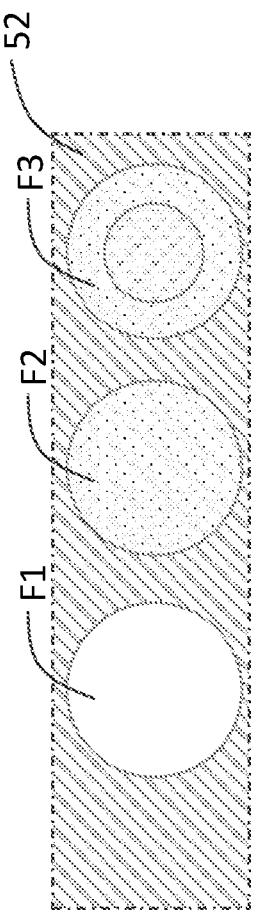
FIG. 6C shows an example embodiment of a filter slider.

One or more emission filter(s) can be placed before each imaging device (e.g., emission filters 18 and 19 shown in FIG. 2), before tube lens 90 (e.g., emission filter 21 shown in FIG. 1A), and/or in nose piece 23 (e.g., emission filter F3 of filter slider 52 shown in FIG. 6C) to transmit the fluorescence response of a specimen. In some embodiments, an emission filter wheel can be used that further filters wavelengths of certain colors from reaching one or more imaging device. The emission filters, can be selected or controlled to allow specified wavelengths to reach the imaging devices. For example, to explore the fluorescence response of Silicon Carbide at different wavelengths, different emission bandpass filters (or a single wavelength) that allow different ranges of wavelengths through (e.g., 414-440 nm, 500-550 nm or 590-670 nm) can be used. These filters can be applied one at a time, or if there are multiple cameras, they can be applied simultaneously or as part of a sequential slider (i.e., using a filter that allows a different wavelength range in front of each imaging device).

Figure 2:
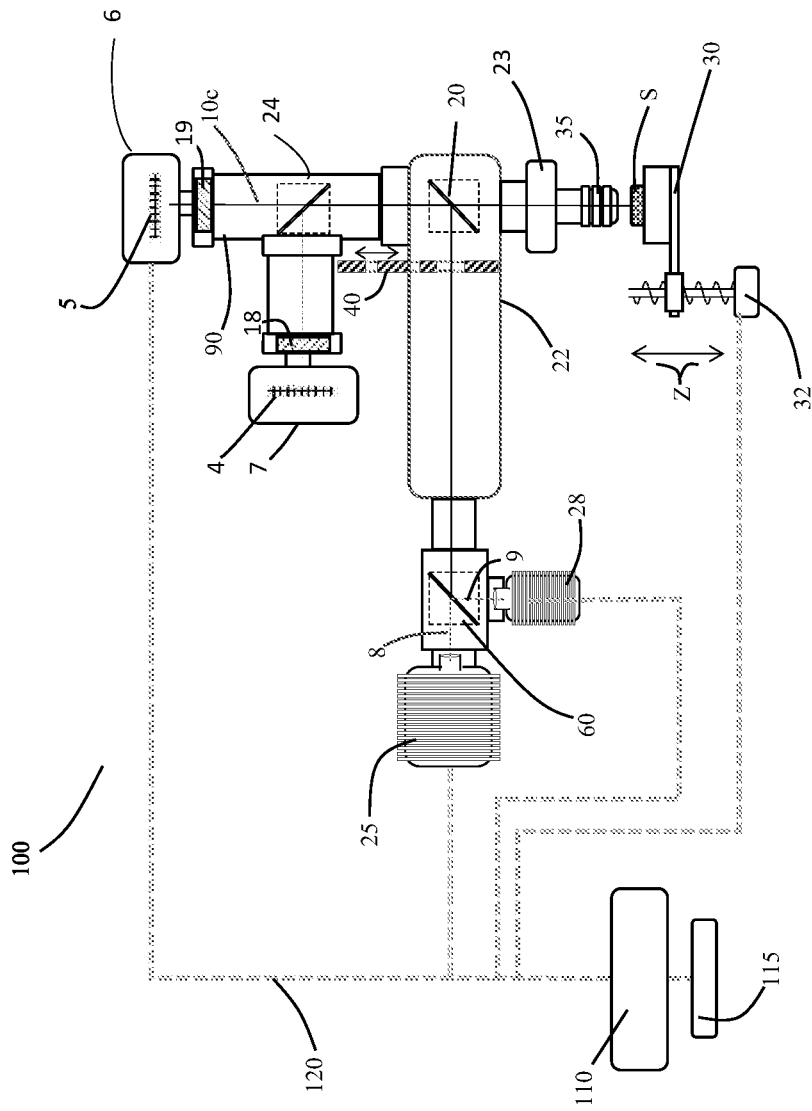
FIG. 2 shows an example embodiment of a fluorescence microscopy inspection systems that includes two imaging devices.

FIG. 2 shows an example embodiment that includes two imaging devices 6 and 7. In some embodiments, imaging devices 6 and 7 can be cameras that includes image sensors 5 and 4 respectively. Imaging devices 6 and 7 can be used to capture images of a specimen. Image sensors 5 and 4 can be, for example, a CCD, a CMOS image sensor, and/or any other suitable electronic device that converts light into one or more electrical signals. Such electrical signals can be used to form images and/or video (including fluorescence images and/or video) of a specimen. In some embodiments, the imaging device can be a high quantum efficiency camera that is effective at producing electronic charge from incident photons. In some embodiments, such electrical signals are transmitted for display on a display screen connected to FMIS 100. In some embodiments, the imaging device can be replaced with or supplemented with an ocular or an eyepiece that is used to view a specimen, or with a spectrometer that is used to measure the spectral emissions from a specimen.

The imaging device can be positioned on a conjugate focal plane of FMIS 100. In some embodiments, the imaging device can be mounted in other locations using appropriate components to adapt the selected location to the optical characteristics of the system. In further embodiments, more than one imaging device can be used. In some embodiments, the imaging device can be a rotatable camera that includes an image sensor, configured to allow the camera to be aligned to a specimen, a stage and/or a feature on a specimen. Some example methods for rotating a camera that can be used by FMIS 100 are described in U.S. Pat. No. 10,048,477 entitled "Camera and Object Alignment to Facilitate Large Area Imaging in Microscopy," which is hereby incorporated by reference herein in its entirety.

FIG. 2 includes emission filtering devices 18 and 19 that are each coupled to a respective imaging device. Each filtering device allows certain wavelengths reflected off of/or emitted from the specimen to be received by the associated imaging device and blocks all other wavelengths. FIG. 2 includes a beam splitter 24 that is positioned above illuminator 22 in the optical pathway of the light reflected off of/emitted from a specimen. The beam splitter can be positioned so that wavelengths in a certain range are directed towards one imaging device and wavelengths of light in a different range are directed towards a second imaging device.

Imaging of a specimen by FMIS 100 can be performed using various modes of observation including brightfield, darkfield, differential interference contrast (DIC), and others known to those familiar with the art.

In some embodiments, FMIS 100 can provide both brightfield and darkfield illumination, either simultaneously or separately. Darkfield illumination refers to an illumination technique that uses oblique lighting, rather than orthogonal light, to illuminate a sample. An objective can include an annular darkfield channel around the brightfield channel that allows light to be transmitted to a sample at an angle of incidence of less than 90 degrees and greater than 0 degrees, typically 25 to 80 degrees. In some embodiments, FMIS 100 can include a brightfield/darkfield slider 40 or other suitable mechanism (e.g., a cage cube) that allows only darkfield illumination, only brightfield illumination, a combination of brightfield/darkfield illumination, or other types of illumination (e.g., DIC) to reach a sample. Different configurations of brightfield/darkfield slider 40 will be discussed in connection with FIGS. 2-5. In other embodiments, brightfield/darkfield illumination can be accomplished by coupling a light source above the darkfield channel and activating the light source via control module 110 to provide darkfield illumination to a sample. Some example embodiments are discussed in connection with FIGS. 2-5.

In some embodiments, as shown in FIGS. 3A, 3B and 3C, FMIS 100 uses a brightfield/darkfield slider 40, a type of slider, that includes a brightfield configuration 43 and a darkfield configuration 44. Brightfield/darkfield slider 40 can be positioned anywhere along light path 10 that travel to a specimen (e.g., in the vertical illuminator, before beam splitter 20 or coupled above or below nosepiece 23). Brightfield/darkfield slider 40 includes two configurations: 43 and 44. In a first position, as shown in FIG. 3A, when configuration 43 is positioned in the light path, the aperture in the center of configuration 43 allows light 10a to pass through and reflect off of beam splitter 20 through the brightfield channel in the center of objective 35 to provide brightfield illumination to a specimen, and blocks light from passing through to darkfield channel 41. Further, in some embodiments, the aperture in the center of configuration 43 can be replaced with an excitation filter that allows only specific wavelengths to reach a specimen (via reflection off of beam splitter 20).

In a second position, as shown in FIG. 3B, when configuration 44 is positioned in the light path, the center aperture is closed, blocking light from being transmitted to brightfield channel 42, and transmitting light 10b, via reflection off of beam splitter 20, through darkfield channel ring 41 to provide oblique illumination to a specimen. A motor or a mechanical mechanism can be used to select and position one of the brightfield/darkfield slider configurations. Light 10c reflected from the specimen then travels through objective 35 to the imaging device(s).

Figure 4A:
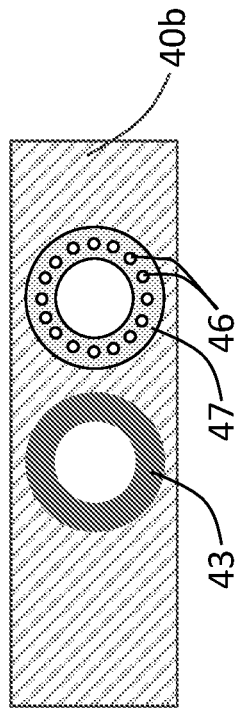

Other configurations of brightfield/darkfield slider 40 are possible, as shown for example in FIGS. 4A (brightfield/darkfield slider 40a) and 4B (brightfield/darkfield slider 40b). Brightfield/darkfield slider 40a can include configurations 45 (which includes a ring of lights 46 (e.g., an LED light ring) around a closed center) and 43 (described in connection with FIGS. 3A-3C). When configuration 45 is positioned in the light path, and LED lights 46 are activated, oblique illumination can be transmitted to a specimen via darkfield channel 41 (by reflecting off of beam splitter 20). Since the center of the ring is closed and blocks light from entering a brightfield channel (via reflection off of beam splitter 20), no brightfield light is transmitted to a specimen.

Figure 4B:
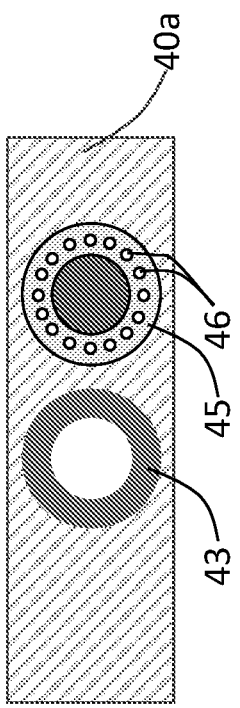
Figure 5B:
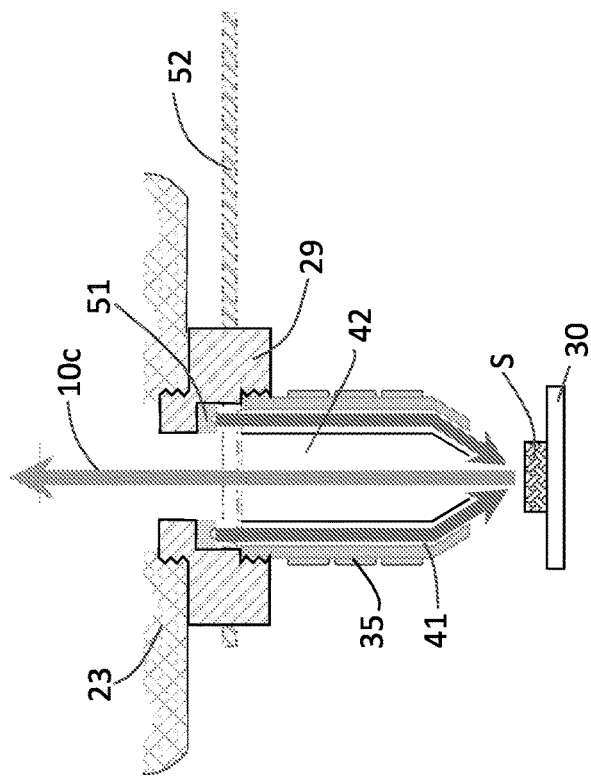
FIG. 5B shows an example nosepiece with a cylinder attachment that includes a darkfield insert.

As shown in FIG. 4B, brightfield/darkfield slider 40b can include configurations 47 (which includes an LED ring of lights 46 around an aperture) and 43 (described in connection with FIGS. 3A and 3B). When configuration 47 is positioned in the light path and LED ring of lights 46 is activated, oblique illumination can be projected and transmitted to a specimen (via reflection off of beam splitter 20), while simultaneously brightfield illumination can pass through the aperture in the center and be transmitted to a specimen through brightfield channel 42 of objective 35 (as shown in FIG. 5B).

Figure 5A:
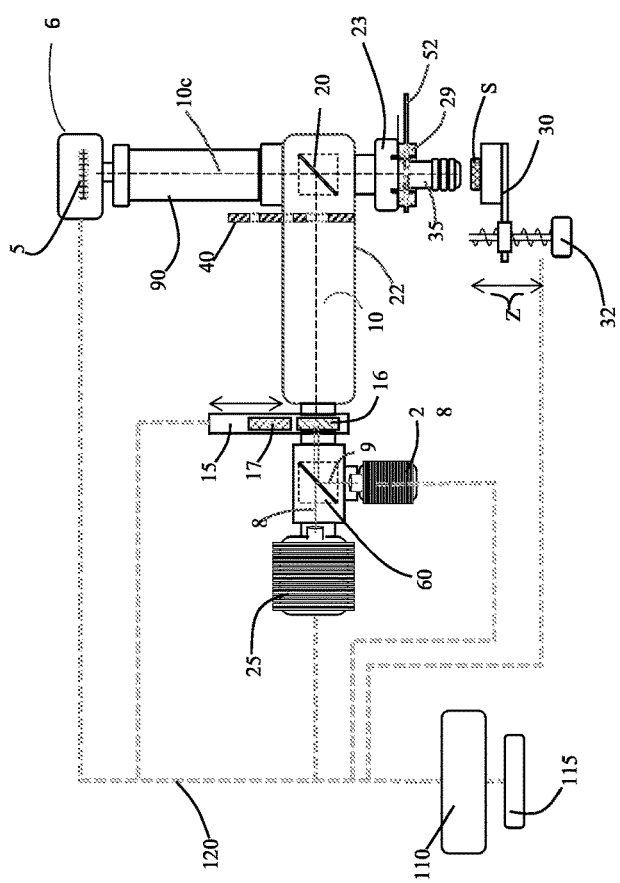
FIG. 5A shows an example embodiment of a fluorescence microscopy inspection system with a cylinder attachment that includes a darkfield insert.

In some embodiments, as shown in FIGS. 5A (showing an example FMIS 100), 5B (showing the details of an example nosepiece 23), 6A (showing an example darkfield insert 51) and 6B (showing an example cylinder 29), a cylinder 29 (also referred to herein as an "attachment" or a "cylinder attachment") can be fastened to nosepiece 23 of FMIS 100 (e.g., via screws or other fasteners), and an objective 35 (including annular darkfield channel 41 and brightfield channel 42) can be fastened to cylinder 29, above darkfield channel 41. Further, a darkfield insert 51 having a ring of lights 46 (e.g., LED lights 46) can be fastened to cylinder 29, above darkfield channel 41. Such a configuration allows cylinder 29 to be fastened into any nosepiece and to be used with any objective. Note, cylinder 29 can be any suitable shape. Further, the ring of lights included on darkfield insert 51 can include any suitable light that emits one or more wavelengths, and can be flexibly interchanged with another insert 51 having a ring of lights that includes a different type of light and emits a different wavelength (or set of wavelengths).

In some embodiments, a filter slider 52, a type of slider, with multiple emission/excitation filters F1, F2, F3 . . . FN can be coupled to cylinder 29, below darkfield insert 51. In some embodiments, filter F1 of slider 52 includes an aperture that allows the light from lights 46, when activated, to pass through unfiltered via darkfield channel 41 to a specimen. Filter F2 of slider 52 includes an excitation filter that allows only certain darkfield and brightfield wavelengths to reach a specimen. In some embodiments, the excitation filter can include an aperture in the center, and only filter the darkfield light that reaches a specimen. In further embodiments, filter F3 can include different filters for the brightfield and darkfield channels. For example, the darkfield filter can be configured to filter the darkfield excitation light, while the brightfield filter can be configured as an emission filter to filter the light emitted from a specimen before it reaches one or more imaging devices. Slider 52 can include other suitable filters that target specific excitation wavelengths from reaching a specimen and/or target specific emission wavelengths from reaching one or more imaging devices.

Note that a combination of the aforementioned excitation and emission filters, in any suitable configuration, can be used to reflect and transmit the desired illumination sources and wavelengths.

Figure 7A:
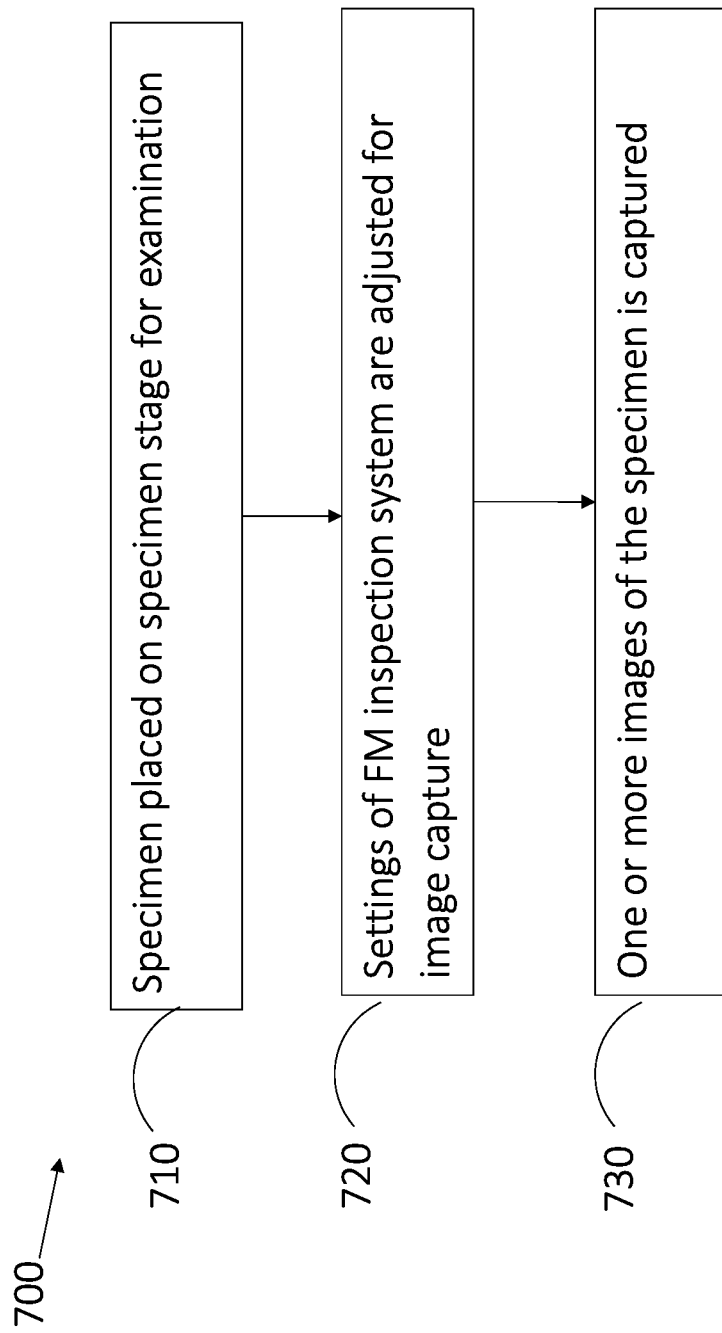
FIG. 7A shows at a high level, an example method for illuminating a specimen using a FM inspection system, according to some aspects of the disclosed technology.

FIG. 7A shows at a high level, an example method 700 for illuminating a specimen using a FM inspection system to achieve desired spectral emissions and other desired illumination for image capture, in accordance with some embodiments of the disclosed subject matter. In some embodiments, method 700 can use FMIS 100.

At 710, a specimen to be examined can be placed on specimen stage 30. In some embodiments, the specimen is brought into focus before the light sources and filters of FMIS 100 are selected.

At 720, the settings of FMIS 100 can be adjusted for image capture. This can be performed manually or automatically (e.g., using a computer algorithm) based on, for example, the features of a specimen being examined, or the material composition of a specimen. In some embodiments, control module 110 can activate and adjust the wavelengths and intensity of light from the light source(s), as well as the corresponding excitation and emission filters, according to stored information for a particular specimen, specimen class and/or any other suitable classification group. The stored information can include a map that identifies the type and location of known features on a specimen ("specimen feature map" or "feature map"). The stored information can also include the material composition of a specimen, the optimal FM inspection system settings for capturing different images of the specimen at different regions of interest (e.g., by specifying the wavelength and intensity of light to direct at a specimen, by selecting and adjusting the appropriate excitation and/or emission filters). Further, the stored information can include information on type and location of known or expected defects of a specimen. Methods for selecting suitable stored information are further discussed in connection with FIG. 8.

At 730, according to some embodiments, one or more images of a specimen are captured by FMIS 100. Steps 720 and 730 can be repeated as many times as desired to capture different images of the specimen. For example, adjustments can be made to the intensity and wavelengths of light sources 25, 25a and/or 28 and corresponding excitation and emission filters to capture different images of the specimen. Adjustments to the light sources can be made, for example, based on stored information for a specimen, including specimen composition, known or expected defects of the specimen, and/or a specimen feature map. Further, wavelengths of light sources 25, 25a and/or 28 and corresponding filters can be adjusted for different regions of interest of the specimen (as indicated by a specimen feature map or otherwise), and images can be captured for each region of interest. In some embodiments, wavelengths of light sources 25, 25a and/or 28 and corresponding filters can be selected in a range appropriate to provide desired excitation to the specimen and/or region of interest. Further, different images of a specimen can be captured by adjusting the type of illumination provided to the specimen, such as, applying brightfield, darkfield, a combination of brightfield and darkfield, and/or DIC illumination.

Figure 7B:
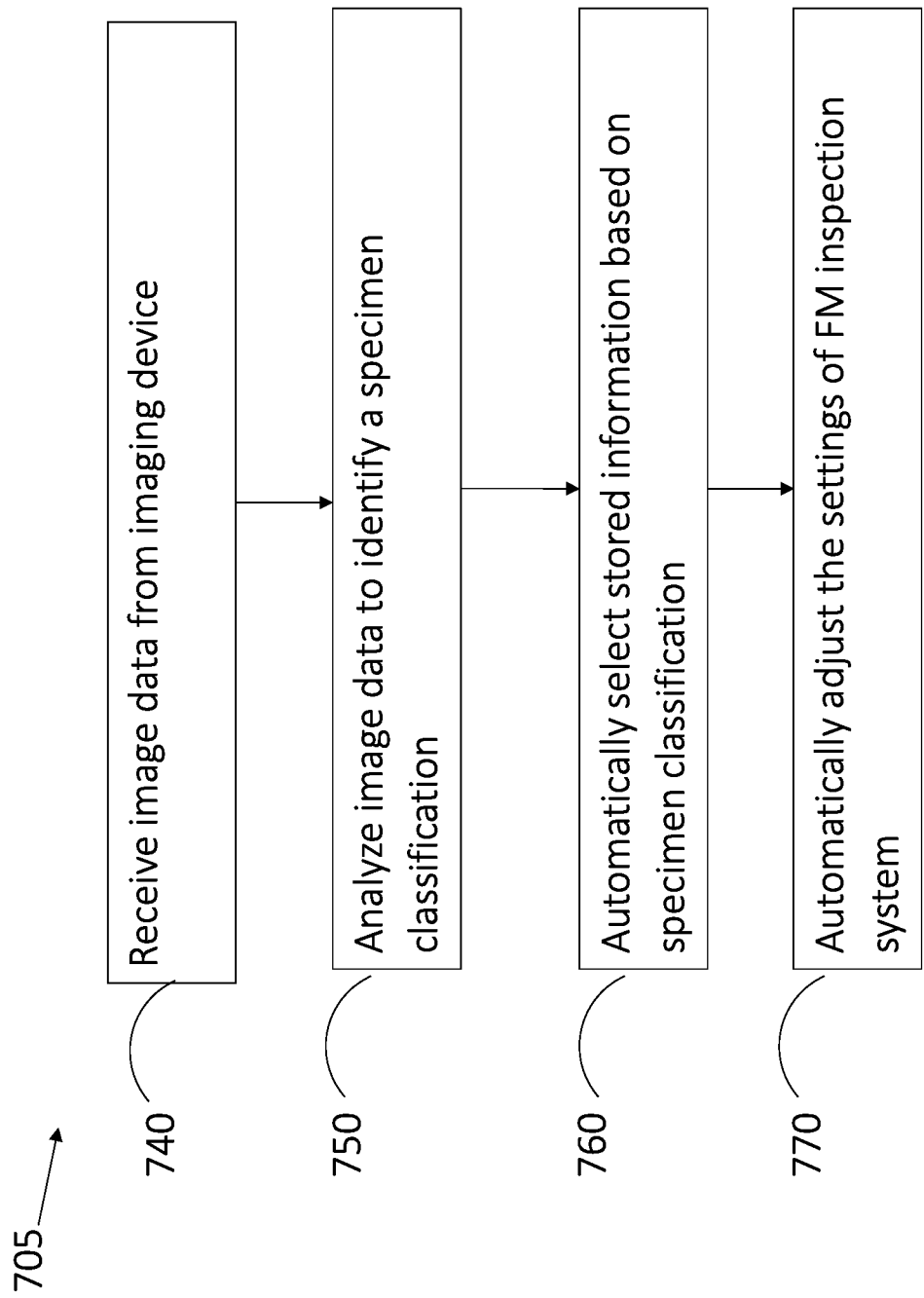
FIG. 7B illustrates steps of an example process for identifying a specimen classification and automatically adjusting the light sources and filters for FM inspection system, according to some aspects of the disclosed technology.
Figure 8:
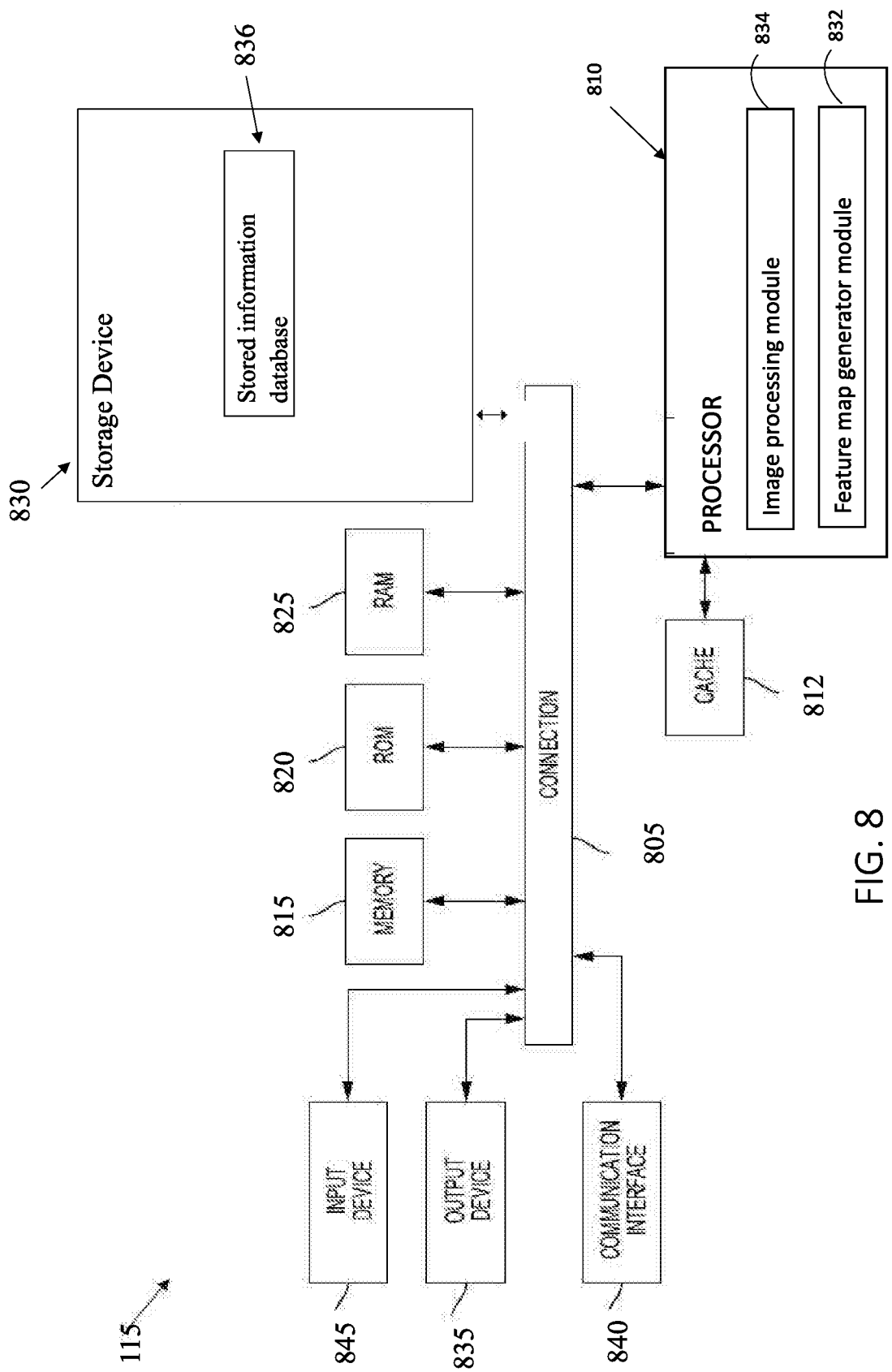
FIG. 8 shows the general configuration of an embodiment of computer analysis system, in accordance with some embodiments of the disclosed subject matter.

FIG. 7B illustrates steps of an example process 705 for identifying a specimen classification and automatically adjusting the light sources and filters for FMIS 100, according to some aspects of the disclosed technology. Process 705 begins with step 740 which image data is received, for example, by an image processing system e.g., image processing module 834 (as shown in FIG. 8). In some approaches, the image data can be included in a received image of a specimen that is taken by an imaging device, as part of FMIS 100. The image data can include all or a portion of a specimen that is disposed on a stage of FMIS 100.

Figure 10:
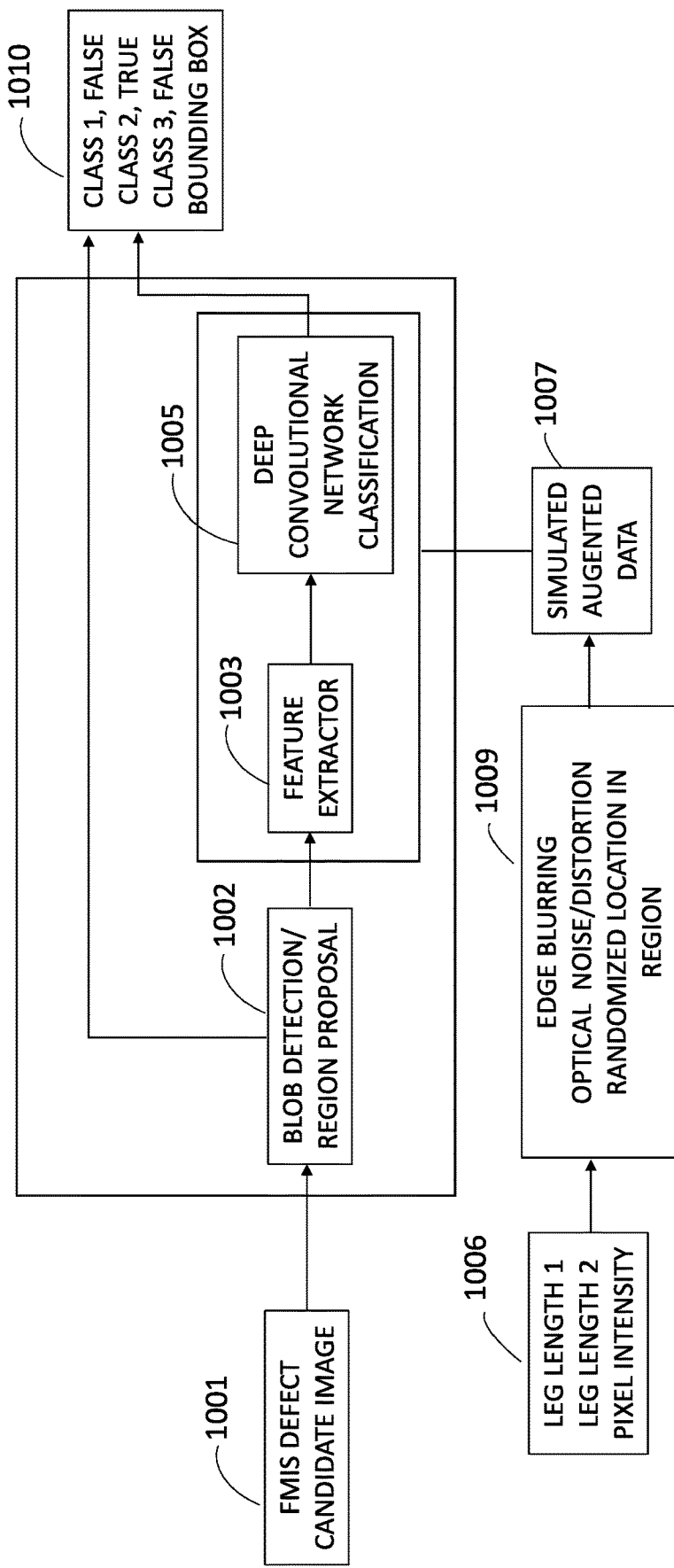
FIG. 10 illustrates an example classification method using convolutional neural networks (CNNs), according to some aspects of the disclosed technology.

In step 750, the image data is analyzed to identify a classification of the specimen. In some instances image analysis may be performed to identify a subset of the specimen, such as a particular region, feature or material within the specimen. As discussed below, machine learning classifiers, computer vision, and/or artificial intelligence can be used to identify/classify the specimen and features on a specimen. An example classification method using convolutional neural networks (CNNs) is shown in FIG. 10.

Subsequently, stored information can be automatically selected based on the specimen (or feature) classification (step 760). The specimen/feature classification can be used to query a database (e.g., stored information database 836) that contains stored information associated with: a specimen, the material composition of a specimen, specimen feature types, and/or other suitable classification group. By referencing the specimen classification determined in step 750, stored information appropriate for the specimen can be automatically identified and retrieved. As discussed above, the stored information can contain a variety of settings data that describe configurations of FMIS 100 that can be used to achieve the optimal illumination and image capture for the specimen, feature, and/or material being observed.

Figure 7C:
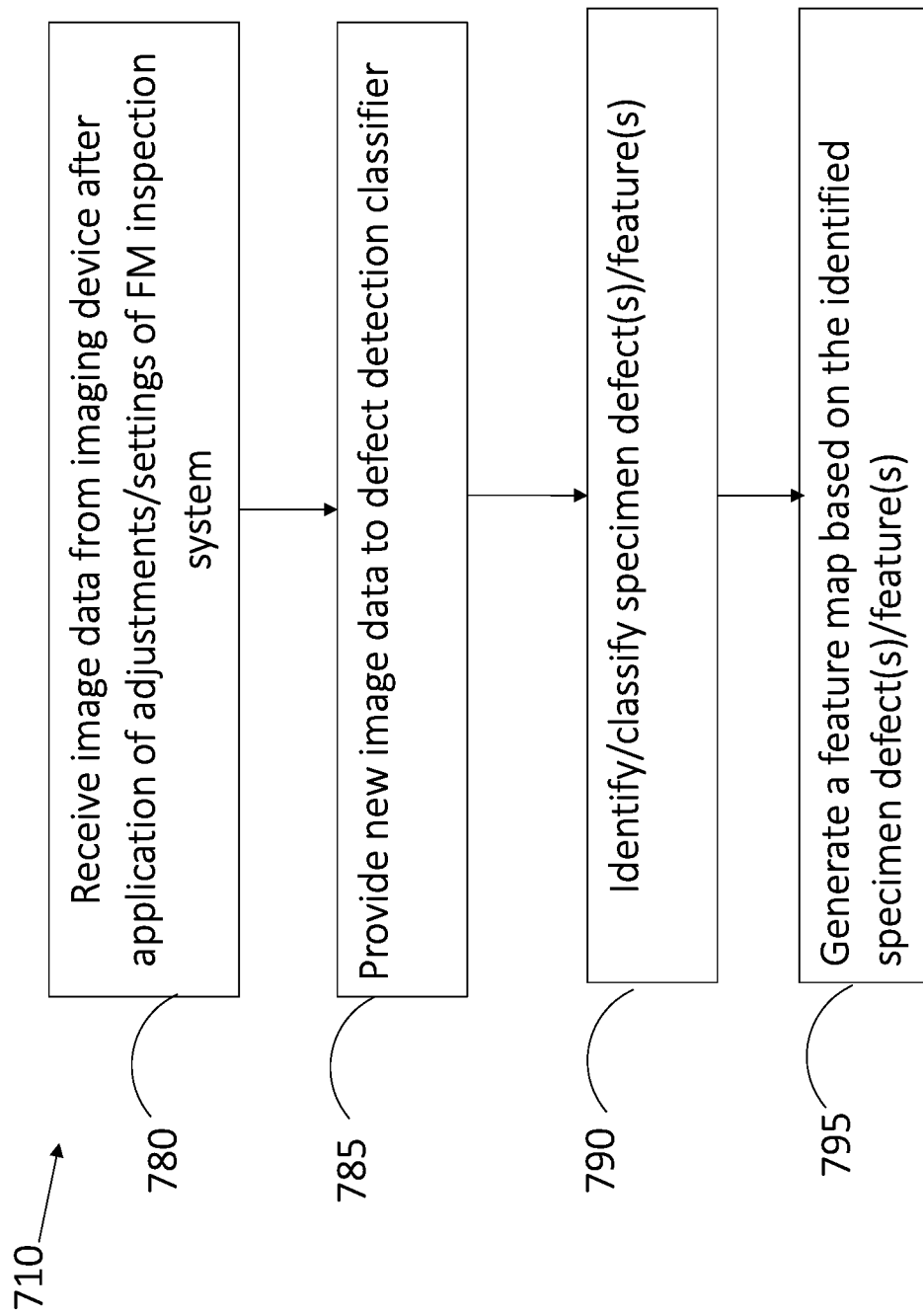
FIG. 7C illustrates steps of an example process for automatically identifying and/or classifying specimen defects, according to some aspects of the disclosed technology.

FIG. 7C illustrates steps of an example process 710 for automatically identifying and/or classifying specimen defects, according to some aspects of the disclosed technology. In some implementations, step 780 can follow step 770 discussed above with respect to FIG. 7B. However, it is understood that process 710 can be performed independently of the various steps of processes 700, and 705, discussed above.

In step 780, image data, including fluorescence, is received from the imaging device following application of adjustments/settings of the FM inspection system. In some approaches, step 780 can be performed subsequent to the automatic classification of the specimen, as describe in step 770, above. As such, the image data received in step 780 can represent an image of the specimen taken under optimized or improved lighting conditions, as realized by the settings selection performed for the FM inspection system.

In step 785, the new image data, including fluorescence, is provided to a defect detection classifier that is configured to automatically identify/detect and/or classify defects/features of the specimen. Defect/feature detection and classification can be performed without knowledge of the specimen classification or type. However, in some embodiments, a specimen classification and/or associated stored information can be used as inputs to the defect detection classifier, and thereby used to inform the process of defect/feature detection and identification.

In step 790, one or more defects/features of the specimen are identified and/or classified. The process of identifying and/or classifying specimen defects/features can be carried out in different ways, depending on the desired implementation. For example, defect/feature identification can be used to automatically generate or update a feature map and/or stored information associated with the given specimen and/or specimen classification (step 795). As such, identification of novel defects/features can be used to improve (train) future defect/feature classification calculations, as well as to improve the automated process of adjusting FM inspection system settings, as described in process 705. In some aspects, defect/feature identification and/or classification can be used to trigger an alert, for example to notify a user of the FM inspection system as to the existence of the detected defect/feature and/or defect/feature type (classification).

It is understood that at least some of the portions of methods 700, 705 and 710 described herein can be performed in any order or sequence not limited to the order and sequence shown in and described in connection with FIGS. 7A, 7B and 7C, in some embodiments. Also, some portions of processes 700, 705 and 710 described herein can be performed substantially simultaneously where appropriate or in parallel in some embodiments. Additionally, or alternatively, some portions of process 700, 705 and 710 can be omitted in some embodiments. Methods 700, 705 and 710 can be implemented in any suitable hardware and/or software. For example, in some embodiments, methods 700, 705 and 710 can be implemented in FM inspection system 100.

FIG. 8 shows the general configuration of an embodiment of computer analysis system 115, in accordance with some embodiments of the disclosed subject matter. Although computer analysis system 115 is illustrated as a localized computing system in which various components are coupled via a bus 805, it is understood that various components and functional computational units (modules) can be implemented as separate physical or virtual systems. For example, one or more components and/or modules can be implemented in physically separate and remote devices, such as, using virtual processes (e.g., virtual machines or containers) instantiated in a cloud environment.

Computer analysis system 115 includes a processing unit (e.g., CPU/s and/or processor/s) 810 and bus 805 that couples various system components including system memory 815, such as read only memory (ROM) 820 and random access memory (RAM) 825, to processor/s 810.

Memory 815 can include various memory types with different performance characteristics, such as memory cache 812. Processor 810 is coupled to storage device 830, which is configured to store software and instructions necessary for implementing one or more functional modules and/or database systems, such as stored information database 836. Each of these modules and/or database systems can be configured to control processor 810 as well as a special-purpose processor where software instructions are incorporated into the actual processor design. As such, image processing module 834 and the stored information database 836 can be completely self-contained systems. For example, imagine processing module 834 can be implemented as a discrete image processing system, without departing from the scope of the disclosed technology.

To enable user interaction with computer analysis system 115, input device 845 can represent any number of input mechanisms, such as a microphone for speech, a touch-sensitive screen for gesture or graphical input, keyboard, mouse, motion input and so forth. An output device 835 can also be one or more of a number of output mechanisms known to those of skill in the art. In some instances, multimodal systems can enable a user to provide multiple types of input to communicate with computer analysis system 115, for example, to convey specimen information relating to a specimen type/classification, or other characteristics. Communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-transitory memory and can be a hard disk or other types of computer readable media that can store data accessible by a computer, such as magnetic cassettes, flash memory cards, solid state memory devices, digital versatile disks, cartridges, random access memories (RAMs) 825, read only memory (ROM) 820, and hybrids thereof.

In practice, stored information database 836 can be configured to receive, store and update context data associated with a specimen, a specimen class and/or or other suitable specimen classification. Context data for each specimen/specimen class/specimen classification can include, but is not limited to: a computer aided design (CAD) file of a specimen and/or features of a specimen, a feature map identifying features and their locations, images of specimens/features of specimens captured by FMIS 100, images of known specimens and/or features, known dimensions, material composition, mechanical and/or physical properties of a specimen, spectral variation maps for known materials or specimens, common stacking faults, structural defects or other defects associated with a specimen, optimal FM inspection settings for features of a specimen, a specimen or specimen classification, identification of regions of interest/or materials of interest to examine. In some embodiments regions of interest can be identified on a feature map. Storage information database 836 can be coupled to image processing module 834 and can transmit data to and receive data from image processing module 834. Further, context data can include data related to the FMIS 100 being used to inspect a specimen such as: the number of light sources, the wavelength range and intensity for each light source, the number of imaging devices and the different types of excitation/emission filters and their locations, of FMIS 100; the range of possible distances between specimen stage 30 and objective 35.

Processor 810 can include an image processing module 834. Image processing module 834 can be used in conjunction with stored information database 836 to classify a specimen based on: image data, including fluorescence, received in a specimen image(s); context data retrieved from stored information database 836, and/or other received specimen characteristics, such as those manually provided by a user, for example, via input 845. Additionally, image processing module can be configured to classify specific specimen features, determine other physical and/or mechanical specimen properties (e.g., specimen reflectivity, specimen dimensions, specimen material composition). Classifications of specimen types, and specimen features/properties can be stored in stored information database 836.

In some embodiments, once a specimen type, specific features and/or the material composition of a specimen has been determined (e.g., by image processing module 834), additional context data associated with the determined specimen type/features can be retrieved from stored information database 836 and sent to control module 110 to adjust the settings of the FMIS 100 to capture specific specimen images and/or to guide the inspection of the specimen by FMIS 100 (e.g., by capturing images of specific features and/or regions of interest).

Figure 9:
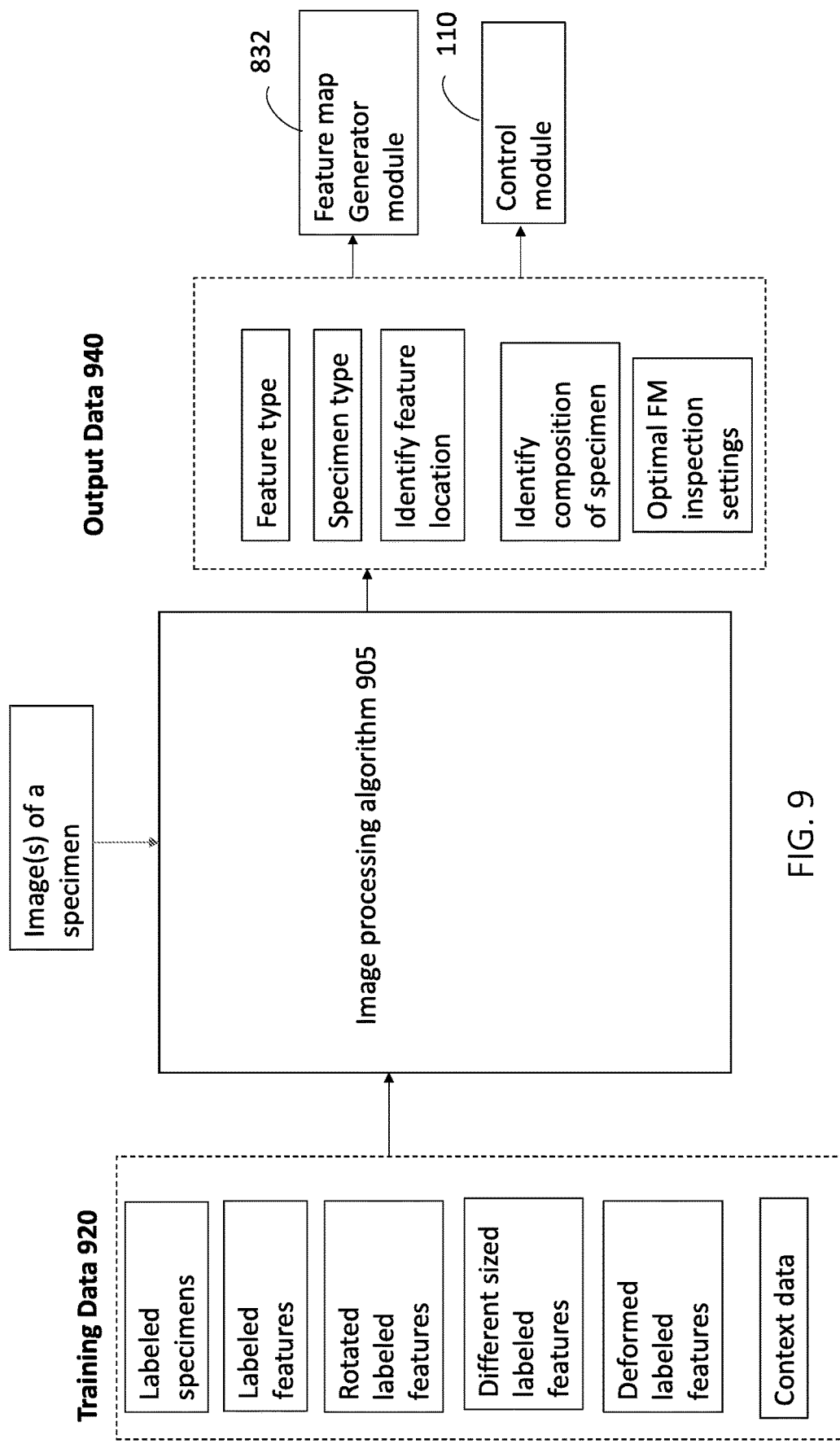
FIG. 9 shows an image processing algorithm that is first trained with training data so that an image processing module can identify a specimen and features on a specimen.

In some embodiments, an image processing module 834 can receive an entire specimen scan, or one or more images of a specimen. Image processing module 834, as shown in FIG. 9, can apply one or more artificial intelligence algorithm(s) to classify a specimen type, as well as features on the specimen.

As understood by those of skill in the art, artificial intelligence/machine learning based classification techniques can vary depending on the desired implementation, without departing from the disclosed technology. For example, machine learning classification schemes can utilize one or more of the following, alone or in combination: hidden Markov models; recurrent neural networks; convolutional neural networks (CNNs); deep learning; Bayesian symbolic methods; general adversarial networks; support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean LSH algorithm), and/or an anomaly detection algorithm, such as a Local outlier factor. Additionally, machine learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

In some instances, machine learning models can be used to perform classification of specimens, materials within a specimen, specimen features, and/or other specimen characteristics. In some aspects, image data from specimen images can be provided as an input to a machine learning classification system, for example, by image processing module 834. Classifier output can specify a sample or feature classification that can then be used to identify specific regions of interest on a specimen for further inspection by FMIS 100, and to provide instructions to control module 110 of FMIS 100 on the type of lights sources and filters that should be used to inspect those areas of interest.

Such algorithms, networks, machines and systems provide examples of structures used with respect to any "means for determining a feature of a specimen using artificial intelligence" or "means for determining a region of interest of a specimen for further inspection using artificial intelligence" or "means for determining a feature of a specimen using artificial intelligence."

Further, for each feature on the specimen or for a region of interest, the image processing module can apply one or more artificial intelligence algorithm(s) to: i) detect the feature; ii) classify the feature type; iii) determine location of the feature on the specimen; iv) determine the material composition of the specimen/feature; v) determine optimal settings for FMIS 100 (e.g., the wavelength excitation setting, the wavelength emission setting, the illumination technique applied). to inspect a feature/specimen/material. In some embodiments, the algorithm(s) used by image processing module 834 can consider context date like location of the feature on a specimen, the type of specimen being inspected, the physical and mechanical properties of the specimen being inspected, similar features on the same or similar specimen, a reference feature map for the inspected specimen, the FM inspection system settings used to generate the specimen scan or specimen image.

Examples of machine-learning artificial intelligence based image processing algorithm that can be used by image processing module 834 is image registration as described by: Barbara Zitova, "Image Registration Methods: A Survey," *Image and Vision Computing*, Oct. 11, 2003, Volume 21, Issue 11, pp. 977-1000, which is hereby incorporated by reference herein in its entirety. The disclosed methods are just examples and are not intended to be limiting. By way of example, machine-learning/artificial intelligence models can be trained using multiple sources of training data, including, but not limited to: a computer aided design (CAD) file of a specimen and/or features of a specimen, a specimen feature map identifying features and their locations on a specimen, images of known specimens and/or features, and/or information about known specimens (e.g., a specimen's dimensions, a specimen's material composition, the mechanical and/or physical properties of a specimen, spectral variation maps for known materials or specimens, common stacking faults, structural defects, feature maps that identify where features within a specimen classification are commonly located).

In some embodiments, as shown in FIG. 9, an image processing algorithm 905 is first trained with training data 920 so that image processing module 834 can recognize and classify a specimen, and detect and recognize features on a specimen. Multiple training techniques may be used and may depend upon the particular classifier model being used. In one example, a CNN, such as a 13-layer CNN, etc., may be trained over multiple epochs using stochastic gradient descent to explore a respective error space. In one example, 80 epochs are used for training and the stochastic gradient descent can include a momentum factor. Additionally, an adaptive learning rate can be used such as, for example and without imputing limitation, an adjustment to the learning rate from 0.1 (e.g., as a step value in the stochastic gradient descent) during early epochs to 0.01 in later epochs.

Training data 920 can include labeled examples of known types of specimens and features. For each classification being trained for (e.g., feature, feature type, type of defect, etc.), training data 920 can further include labeled imaged of deformed features (these can be actual deformed features or deformed features that were simulated according to predefined parameters) and training data 920 can include labeled images of such deformed features. Training data 920 can also include labeled images of each defect type rotated from 0-360 degrees. Training data 920 can also include labeled images of each defect type generated at different sizes. One example of training data 920 are images including labeled stacking faults having different structures, shapes and sizes, and the corresponding fluorescence emission for each type of stacking fault. Further, the labeled images can also include additional context data like information specifying the settings for FMIS 100 (e.g., wavelength excitation setting, wavelength emission setting, lighting technique applied), the material composition of a feature or a specimen, location of a feature on a specimen, physical/mechanical properties of the feature and/or any other suitable characteristic. In some embodiments, training data can also include unlabeled data.

Once the image processing algorithm is trained it can be applied by image processing module 834 to a received specimen scan(s) or image(s) of a specimen to classify specimen type, detect features, classify fault type, determine feature and/or fault locations, determine specimen composition, and determine optimal FM inspection system settings for detecting a feature/specimen. The output data can be displayed visually, printed, or generated in file form and stored in database 836 or transmitted to other components for further processing.

In some embodiments, output data can be sent to a feature map generator module 832 to generate a feature map for the specimen. In some embodiments, the output data may comprise multiple images. The generated feature map can identify and locate features on the specimen. The generated feature map can be displayed visually, printed, or generated in file form and stored in stored information database 836 or transmitted to other modules for further processing.

Further, the generated feature map can be used to focus further inspection by FMIS 100 on specific features and/or regions of a specimen. Based on the characteristics of the features and regions, stored information can be retrieved from stored information database 836. For example, for each feature and/or region of interest, instructions can be retrieved from stored information database 836 for applying different lights sources and illumination techniques, at different wavelengths and intensity levels, using different excitation/emission filters to capture different images and transmitted to control module 110. For example, by applying different bandpass emission filters before one or more imaging device, different fluorescence emissions can be detected and different features of a specimen identified (e.g., irregularities or defects in the surface) of a specimen.

FIG. 10 describes one embodiment for training image processing module 834 that uses a deep convolution network classifier 1005. Classifier 1005 can be trained using simulated augmented data 1007. For example, known defects for different types of specimens can be generated at different orientations, different sizes, different pixel intensities, different locations on a specimen (1006 and 1009). The shapes of these known defects can be blurred and/or distorted. Once trained, one or more candidate images of FMIS 100 can be input into a classifier (1009). In some embodiments, the image (1001) is first processed by detecting certain regions and extracting features from those regions (1002 and 1003). Classifier 1005 is then used to analyze the extracted features and to classify the features into types and locate those features on the specimen (1010). Note, some example methods for locating a feature on the specimen that can be used by FMIS 100 are described in U.S. patent application Ser. No. 16/262,017 entitled "Macro Inspection Systems, Apparatus and Methods," which is hereby incorporated by reference herein in its entirety. In some embodiments, the known defects include stacking faults having different structures, sizes and shapes.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The various systems, methods, and computer readable media described herein can be implemented as part of a cloud network environment. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. The cloud can provide various cloud computing services via cloud elements, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. A person of ordinary skill in the art would understand that the term mechanism can encompass hardware, software, firmware, or any suitable combination thereof.

Unless specifically stated otherwise as apparent from the above discussion, it is appreciated that throughout the description, discussions utilizing terms such as "determining," "providing," "identifying," "comparing" or the like, refer to the action and processes of a computer system, or similar electronic computing device, that manipulates and transforms data represented as physical (electronic) quantities within the computer system memories or registers or other such information storage, transmission or display devices. Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps and system-related actions. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The FM inspection apparatus, method and system have been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed:

1. A microscopy system comprising:
   one or more incoherent light sources configured to emit at least a first wavelength of light that will cause a specimen positioned on a stage to fluoresce and a second wavelength of light that will not cause the specimen to fluoresce;
   an excitation filter configured to filter light from the one or more incoherent light sources, wherein the filtered light is configured to match a predetermined bandgap energy associated with the specimen;
   an objective comprising a brightfield channel and a darkfield channel;
   a slider positioned along a lightpath between the objective and the one or more incoherent light sources, wherein the slider includes at least one configuration configured to transmit light along the lightpath to at least the darkfield channel configured to direct light to the specimen at an oblique angle; and
   an emission filter configured for filtering selected wavelengths of light reflected from the specimen to a receiving camera.

2. The microscopy system of claim 1, further comprising:
   a nosepiece connected to the objective.

3. The microscopy system of claim 2, wherein the excitation filter is positioned in the nosepiece.

4. The microscopy system of claim 1, wherein the slider comprises:
   a first bandpass filter configured to allow a first range of wavelengths to passthrough; and
   a second bandpass filter configured to allow a second range of wavelengths to passthrough.

5. The microscopy system of claim 4, further comprising:
   a mechanical element configured to select and position each of the first bandpass filter and the second bandpass filter.

6. The microscopy system of claim 1, further comprising:
   a beam splitter configured to reflect light emitted from the one or more incoherent light sources through the brightfield channel of the objective.

7. The microscopy system of claim 6, wherein the beam splitter is positioned in an optical pathway of the one or more incoherent light sources.

8. The microscopy system of claim 6, further comprising:
   a second receiving camera.

9. The microscopy system of claim 8, wherein the beam splitter is positioned so that wavelengths in a first range are directed towards the receiving camera and wavelengths in a second range are directed towards the second receiving camera.

10. The microscopy system of claim 1, further comprising:
    a focusing mechanism coupled to the stage, the focusing mechanism configured to adjust the stage in a Z direction towards and away from the objective.

11. A microscopy system comprising:
    one or more incoherent light sources configured to emit at least a first wavelength of light that will cause a specimen positioned on a stage to fluoresce and a second wavelength of light that will not cause the specimen to fluoresce;
    an excitation filter configured to filter light from the one or more incoherent light sources, wherein the filtered light is configured to match a predetermined bandgap energy associated with the specimen;
    an objective comprising a brightfield channel and a darkfield channel; and
    a slider positioned along a lightpath between the objective and the one or more incoherent light sources, wherein the slider includes at least one configuration configured to transmit light along the lightpath to at least the darkfield channel configured to direct light to the specimen at an oblique angle.

12. The microscopy system of claim 11, further comprising:
    a nosepiece connected to the objective.

13. The microscopy system of claim 12, wherein the excitation filter is positioned in the nosepiece.

14. The microscopy system of claim 11, wherein the slider comprises:
    a first bandpass filter configured to allow a first range of wavelengths to passthrough; and
    a second bandpass filter configured to allow a second range of wavelengths to passthrough.

15. The microscopy system of claim 14, further comprising:
    a mechanical element configured to select and position each of the first bandpass filter and the second bandpass filter.

16. The microscopy system of claim 11, further comprising:
    a beam splitter configured to reflect light emitted from the one or more incoherent light sources through the brightfield channel of the objective.

17. The microscopy system of claim 16, wherein the beam splitter is positioned in an optical pathway of the one or more incoherent light sources.

18. The microscopy system of claim 16, further comprising:
    a second receiving camera.

19. The microscopy system of claim 18, wherein the beam splitter is positioned so that wavelengths in a first range are directed towards the receiving camera and wavelengths in a second range are directed towards the second receiving camera.

20. The microscopy system of claim 11, further comprising:
    a focusing mechanism coupled to the stage, the focusing mechanism configured to adjust the stage in a Z direction towards and away from the objective.

* * * * *